US008470950B2

(12) United States Patent (10) Patent No.: US 8,470,950 B2
Maliverney et al. (45) Date of Patent: Jun. 25, 2013

(54) METHOD FOR SEALING AND ASSEMBLING COMPONENTS OF A DRIVE TRAIN

(75) Inventors: Christian Maliverney, Saint Julien sur Bibost (FR); Tania Ireland, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 0 days.

(21) Appl. No.: 13/377,762

(22) PCT Filed: Jun. 10, 2010

(86) PCT No.: PCT/FR2010/000421
§ 371 (c)(1),
(2), (4) Date: Mar. 29, 2012

(87) PCT Pub. No.: WO2010/142871
PCT Pub. Date: Dec. 16, 2010

(65) Prior Publication Data
US 2012/0181753 A1  Jul. 19, 2012

(30) Foreign Application Priority Data

Jun. 12, 2009 (FR) .................... 09 02847

(51) Int. Cl.
*C08G 77/08* (2006.01)
*E04B 1/682* (2006.01)
(52) U.S. Cl.
USPC ............................................ 528/21; 277/316
(58) Field of Classification Search
None
See application file for complete search history.

(56) References Cited

U.S. PATENT DOCUMENTS

| 4,339,563 | A | * | 7/1982 | Takago et al. | 528/14 |
|---|---|---|---|---|---|
| 4,358,613 | A | * | 11/1982 | Mark | 564/238 |
| 4,395,526 | A | * | 7/1983 | White et al. | 528/18 |
| 4,472,551 | A | * | 9/1984 | White et al. | 524/728 |
| 4,489,127 | A | * | 12/1984 | Gutek et al. | 442/71 |
| 4,515,932 | A | * | 5/1985 | Chung | 528/16 |
| 4,814,368 | A | * | 3/1989 | Stein et al. | 524/158 |
| 4,849,564 | A | * | 7/1989 | Shimizu et al. | 524/114 |
| 5,176,960 | A | * | 1/1993 | Shimizu et al. | 428/405 |
| 6,235,832 | B1 | * | 5/2001 | Deng et al. | 524/525 |
| 6,906,161 | B2 | * | 6/2005 | Sakamoto et al. | 528/35 |
| 7,053,166 | B2 | * | 5/2006 | Brehm et al. | 528/14 |
| 7,649,059 | B2 | * | 1/2010 | Yoshitake et al. | 525/478 |
| 7,763,358 | B2 | * | 7/2010 | Matsumura et al. | 428/452 |
| 8,372,935 | B2 | * | 2/2013 | Maliverney et al. | 528/21 |
| 2005/0014894 | A1 | * | 1/2005 | Flannigan et al. | 524/864 |
| 2009/0182091 | A1 | * | 7/2009 | Noro et al. | 524/588 |
| 2010/0036049 | A1 | * | 2/2010 | Matsushita et al. | 524/588 |

FOREIGN PATENT DOCUMENTS

| EP | 1 939 257 A1 | 7/2008 |
|---|---|---|
| EP | 1 985 666 A1 | 10/2008 |

OTHER PUBLICATIONS

International Search Report (PCT/ISA/210) issued on Aug. 20, 2010, by French Patent Office as the International Searching Authority for International Application No. PCT/FR2010/000421.
Written Opinion of the International Searching Authority (Form PCT/ISA/237) issued by the European Patent Office as the International Searching Authority in PCT/FR2010/000421 on Dec. 12, 2011, and an English language translation of the Written Opinion.

* cited by examiner

*Primary Examiner* — Robert S Loewe
(74) *Attorney, Agent, or Firm* — Dentons US LLP

(57) ABSTRACT

A method is described for sealing and assembling components of a drive train by means of silicon elastomers prepared using silicon compositions that do not contain any metal catalyst such as, for example, tin, and cross-linking by polycondensation reactions in the presence of water (for example, ambient moisture).

14 Claims, No Drawings

METHOD FOR SEALING AND ASSEMBLING COMPONENTS OF A DRIVE TRAIN

This application claims priority under 35 U.S.C. §119 of FR 0902847, filed Jun. 12, 2009, and is the United States national phase of PCT/FR2010/000421, filed Jun. 10, 2010, and designating the United States (published in the French language on Dec. 16, 2010, as WO 2010/142871 A1; the title and abstract were also published in English), each hereby expressly incorporated by reference in its entirety and each assigned to the assignee hereof.

The present invention relates to a method for sealing and assembling components of a drive train by means of silicone elastomers prepared from silicone compositions which contain no metal catalyst, such as no tin catalyst, for example, and which crosslink by polycondensation reactions in the presence of water (for example, ambient humidity). The silicone elastomers prepared on the basis of the method according to the invention exhibit:

- a setting rate (crosslinking over at least 2 mm in 24 hours) suitable for the requirements of the applications, and
- good mechanical strength properties such as breaking strength, modulus at 100% elongation, and Shore hardness, and
- good resistance to aging in chemically aggressive fluids such as those used, for example, in a drive train, specifically engine oils, axle and transmission lubricants, oil/gasoline mixtures, cooling liquids, fuels or antifreeze liquids.

By "cooling liquid" is meant any heat-transfer liquid used for evacuating the heat energy from a mechanical or electronic system.

Silicone compositions which are crosslinkable to elastomer to form gaskets are known. They are especially suitable for forming gaskets "in situ", these gaskets being formed directly during the assembly of the elements, more particularly in the automotive segment.

Among the silicone compositions crosslinkable to elastomer that are known for this type of application, particular attention is being given to a category comprising those which crosslink from ambient temperature, since they do not require the installation of an energy-consuming oven.

These silicone compositions are classed into two separate groups: one-component (RTV-1) compositions, and two-component (RTV-2) compositions. The term "RTV" is the acronym for "Room Temperature Vulcanizing".

On crosslinking, the water (either provided by atmospheric humidity, in the case of RTV-1 compositions, or introduced into one part of the composition, in the case of RTV-2 compositions) allows the polycondensation reaction, which leads to the formation of the elastomeric network.

Generally speaking, one-component (RTV-1) compositions crosslink when they are exposed to atmospheric humidity. The kinetics of polycondensation reactions are usually extremely slow; these reactions are therefore catalyzed by an appropriate catalyst.

The two-component (RTV-2) compositions are sold and stored in the form of two components: a first component contains the polymeric base materials, and the second component contains the catalyst. The two components are mixed at the time of use, and the mixture crosslinks into the form of a relatively hard elastomer. These two-component compositions are well-known and are described in particular in the work by Walter Noll, "Chemistry and Technology of Silicones", 1968, 2nd edition, on pages 395 to 398.

These compositions generally comprise at least three or four different ingredients:

- a reactive silicone polymer (containing hydroxyl functions, or prefunctionalized by a silane so as to have alkoxy end groups),
- a crosslinking agent, generally a silane, a silicate or a polysilicate,
- a condensation catalyst, and
- optionally water (in the case of RTV-2).

The condensation catalyst is usually based on an organotin compound. Indeed, numerous tin-based catalysts have already been proposed as crosslinking catalysts for these RTV-1 or RTV-2 compositions. Conventional polycondensation catalysts comprise dialkyltin compounds, especially dialkyltin dicarboxylates such as dibutyltin dilaurate and dibutyltin diacetate, alkyl titanate compounds such as tetrabutyl or tetraisopropyl titanate, and titanium chelates (EP-A-0 885 933, U.S. Pat. No. 5,519,104, U.S. Pat. No. 4,515, 932, U.S. Pat. No. 4,563,498, U.S. Pat. No. 4,528,353).

However, the alkyltin-based catalysts, although highly effective, and usually colorless, liquid, and soluble in the silicone oils, have the drawback of being toxic (CMR2, toxic for reproduction).

With the aim of replacing these catalysts, international application WO 2004/020525 describes one-component (RTV-1) silicone compositions which are used for preparing mastics or adhesives and which undergo cold crosslinking when exposed to atmospheric humidity, these compositions comprising, in addition to the customary components:

- a specific, essential crosslinker (D), which is a silane having 1-methylvinyloxy functions, and is known for its high reactivity by comparison with that of conventional crosslinkers, and
- catalysts which are organic, imino-functional derivatives, of formulae (I) or (II) below:

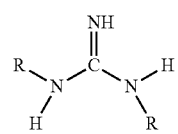

(I)

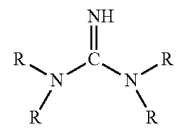

(II)

where R is a specific radical selected from the following groups: methyl, isopropyl, phenyl, and ortho-tolyl. Examples of these organic, imine-type derivatives are 1,3-diphenylguanidine, 1,3-di-o-tolylguanidine, 1,3-dimethylguanidine, and 1,1,3,3-tetramethylguanidine, which is the preferred derivative.

These derivatives have the particular feature of possessing an unsubstituted imine function, in other words a function of the type C=NH. It should be noted that a conventional trialkoxysilane crosslinker, component (E), is still used in combination with the crosslinker (D), which is a silane renowned for its high reactivity due to the presence of 1-methylvinyloxy functions.

However, the problem associated with the use of the imino-functional organic catalysts described in international application WO 2004/020525 is that they have to be used in the presence of specific crosslinkers which are very reactive and expensive (silanes having 1-methylvinyloxy functions), which is to say that conventional crosslinkers with simple structures, which are very widely used in RTV-I or RTV-II formulations, such as alkyltrialkoxysilanes, alkyl silicates or polyalkyl silicates, for example, cannot be combined with them without the mandatory presence of a highly reactive crosslinker such as the silane having 1-methylvinyloxy functions. The reason is that, without the presence of this very reactive silane, the crosslinking of the composition to form elastomer is inadequate, and does not allow good mechanical properties to be obtained. Accordingly, when the 1,1,3,3-tetramethylguanidine (TMG) derivative, which is presented in the preferred embodiment of this patent application, is used with a conventional crosslinker, such as a polyalkyl silicate, for example, and without the presence of a reactive, methylvinyloxy-functional silane, in a one-component RTV (RTV-I), the crosslinking of the system is inadequate and is unable to give rise to a silicone elastomer.

For a lasting development, it therefore appears necessary to find new silicone compositions which crosslink at ambient temperature so as to form silicone gaskets by means of nontoxic catalysts and which can be used in the crosslinking of compositions which form elastomers on the basis of both one-component and two-component formulations.

During its setting, the gasket first forms a surface skin (surface setting), and then crosslinking must continue within until curing is complete (through-setting). The setting kinetics are an essential criterion of these gaskets. There is therefore great advantage in having through-crosslinkable one-component compositions whose setting kinetics are as rapid as possible.

It is significant that these catalysts can be used with a wide range of crosslinkers that are commonly used in the industrial chemistry of silicones.

Moreover, in light of an extensively evolving transport industry, new constraints are becoming apparent in association with the increase in engine performance, the increase in operating temperatures, the reduction in fuel consumption, and the reduction in maintenance frequency.

Accordingly, the formulators of drive train fluids (engine oil, axle and transmission lubricant, oil/gasoline mixture, cooling liquid, fuel or antifreeze liquid) are continuing to improve the performance levels of these products by adding additives with increasingly great effect. The amount of additives incorporated into these products is increasing more and more, the effect of this being to increase their chemical aggression toward flexible members, as for example the gaskets, which are present in the devices in which these products are employed.

There is therefore an increasing need to find a new method for sealing and assembling components of a drive train, using silicone elastomers which are prepared on the basis of an organopolysiloxane composition that contains no tin and which are highly resistant to contact with the various fluids used in these drive trains.

Accordingly, one of the key objectives of the present invention is to provide a method which employs an organopolysiloxane composition that contains no tin and cures to a silicone elastomer in the presence of moisture with rapid surface setting kinetics, followed by complete through-setting, so as to prepare silicone elastomers which are useful for the sealing and assembly of elements of a drive train.

Another objective is to provide a new method for sealing and assembling components of a drive train by means of silicone gaskets which are highly resistant to contact with the various fluids used in a drive train and are prepared on the basis of silicone compositions, using nontoxic catalysts.

These objectives, among others, are achieved by the present invention, which relates to a new method for sealing and assembling at least one component of a drive train, comprising the following steps a) to d):

a) a polyorganosiloxane composition X is prepared which is crosslinkable to elastomer by polycondensation reactions, which contains no metal catalyst, and which comprises:
   a silicone base B comprising at least one polyorganosiloxane oil which is crosslinkable by polycondensation reaction so as to form a silicone elastomer, and
   a catalytically effective amount of at least one polycondensation catalyst A which is a nonsilylated organic compound conforming to the general formula (I):

(I)

in which
   the identical or different radicals $R^1$ represent independently of one another a linear or branched monovalent alkyl group, a cycloalkyl group, a (cycloalkyl)alkyl group, the cyclic moiety being substituted or unsubstituted and possibly comprising at least one heteroatom or a fluoroalkyl group,
   the radical $R^2$ represents a hydrogen atom, a linear or branched monovalent alkyl group, a cycloalkyl group, an alkyl group substituted by a cyclic moiety which is substituted or unsubstituted and possibly comprises at least one heteroatom, an aromatic group, an arylalkyl group, a fluoroalkyl group or an alkylamine or alkylguanidine group, and
   the radical $R^3$ represents a linear or branched monovalent alkyl group, a cycloalkyl group, an alkyl group which is substituted by a cyclic moiety which is substituted or unsubstituted and possibly comprises at least one heteroatom, or an arylalkyl, fluoroalkyl, alkylamine or alkylguanidine group;
   when the radical $R^2$ is not a hydrogen atom, the radicals $R^2$ and $R^3$ may be joined to form a 3-, 4-, 5-, 6- or 7-membered aliphatic cyclic moiety optionally substituted by one or more substituents, and
   with the further condition that the radicals $R^1$, $R^2$, and $R^3$ contain no silicon atom;

b) said polyorganosiloxane composition X is applied to at least one contact zone of said component, continuously or discontinuously, optionally in the form of a bead;

c) said polyorganosiloxane composition X is caused to crosslink to silicone elastomer in the presence of moisture provided by the ambient air or by prior addition of water, so as to form a profiled gasket; and d) said component is assembled to another component of the drive train, in such a way that the joint formed provides for assembly and sealing between the two components of the drive train.

In order to achieve this objective, the Applicant had the merit to demonstrate, entirely surprisingly and unexpectedly, that the use of a polyorganosiloxane composition X comprising the polycondensation catalyst A according to the invention allows preparation, by the method of the invention, of silicone elastomers having remarkably rapid surface setting kinetics, followed by complete through-setting, so as to prepare silicone elastomers which allow the sealing and assembly of components or elements that are used in a drive train.

Moreover, the silicone elastomers used in the method according to the invention have the advantage of maintaining good mechanical properties even when they are in prolonged contact with chemically aggressive fluids such as those used, for example, in a drive train.

Examples of chemically aggressive fluids include the following, for example: engine oils, axle and transmission lubricants, oil/gasoline mixtures, cooling liquids, fuel oils, and antifreeze liquids.

The inventors have the further merit of having overcome the technical prejudice, as taught, for example, by international application WO 2004/020525, suggesting that, hitherto, catalysts which are close in terms of structure, such as 1,3-diphenylguanidine, 1,3-di-o-tolylguanidine, 1,3-dimethylguanidine or 1,1,3,3-tetramethylguanidine, should be combined with specific, highly reactive and expensive crosslinkers (silanes having 1-methylvinyloxy functions) in order to crosslink RTV formulations.

The nonsilylated compounds used according to the method of the invention and conforming to the general formula (I) are 1,2,3-trisubstituted and 1,2,3,3-tetrasubstituted guanidines and have the advantage of being liquid, colorless, odorless, and soluble in the silicone matrices. The nonsilylated guanidines according to the invention are employed in the silicone systems to be crosslinked in very small amounts, and, depending on the amount, allow the working times to be adapted to the application, while ensuring excellent hardnesses of the resulting elastomers, and also an excellent thermal stability, thereby removing the problems associated with reversion phenomena.

According to one particular embodiment, steps c) and d) are replaced respectively by the following steps c1) and d1):

c1) the zone or zones containing said noncrosslinked polyorganosiloxane composition X are contacted with a contact surface of the other component of the drive train, and the two components of the drive train are assembled, and d1) said polyorganosiloxane composition X is caused to crosslink to silicone elastomer in the presence of moisture provided by the ambient air or by prior addition of water, so as to form a yielded gasket providing assembly and sealing between the two components of the drive train.

Within the automotive segments, silicone elastomers are often used in the form of silicone seals. The term "silicone seals" encompasses a number of types of gasket seals, namely "yielded" seals (YS), also referred to as flattened seals, and profiled seals (PS), also referred to as "shaped seals".

"Yielded" seals (YS) are generally formed following the application of a bead of the compositions, in paste form, to the contact zone between two metallic or plastic elements requiring assembly. The bead of paste is first applied to one of the elements, and then the other element is applied to the first element; the result is that the bead is flattened before it undergoes conversion to elastomer. This type of seal is directed to assemblies which presently cannot be disassembled (oil sump seals, timing case seals, etc.).

"Profiled" seals (PS) are used more particularly in the transportation and automotive segments for sealing applications on all engine components that require the possibility of disassembly, such as, for example, the cylinder head cover, oil pump, water pump, radiator tank, oil sump, timing case, and clutch guide. "Profiled" seals (PS) are generally formed following the application of a bead of the compositions, in paste form, to the contact zone between two elements requiring assembly. However, following the application of the bead of paste to one of the elements, the bead is caused to crosslink to elastomer, and then the second element is applied to the first element. The result is that an assembly of this kind can easily be disassembled, since the element which is applied to the element having received the seal does not adhere to that seal. Moreover, the elastomeric nature of the seal means that it conforms to the irregularities in the surfaces to be joined, and consequently there is no point in laboriously machining the surfaces to be contacted with one another and to forcefully clamp the resulting assemblies. These special features make it possible, to some extent, to omit the fixing seals, struts, and ribs which are commonly intended to stiffen and reinforce the elements of assemblies. The "profiled" seal is generally a closed bead of silicone elastomer with an ovoid cross section, which is applied in accordance with a well-defined profile and is required to provide a seal between two (or more) disassemblable components.

Since the compositions used in the method according to the invention cure rapidly at ambient temperature and even in a confined environment, the result is that the silicone gasket seals resulting from the curing of these compositions can be prepared under very rigorous conditions of industrial manufacture. For example, they can be manufactured on the typical assembly lines of the automobile industry, equipped with an automatic apparatus for applying the compositions. This automatic apparatus very often possesses a mixer head and an applicator nozzle, the latter moving in accordance with the profile of the seals to be manufactured. The compositions manufactured and distributed by means of this apparatus preferably have a cure time which is well adjusted on the one hand to prevent solidification within the mixer head and on the other hand to obtain complete crosslinking after the end of application of the bead of paste to the components that are to be joined. These "shaped" seals are especially suitable for seals on rocker arm covers, on transmission covers, on timing struts and even on oil sumps.

The component may be diverse and varied in its nature, and may be made of glass, plastic, metal, etc.

According to another, particular embodiment of the method according to the invention, the component of the drive train is selected from the group consisting of a cylinder head, an oil sump, a cylinder head cover, a timing case, a bearing bar, an engine cylinder block, a transmission, a water pump, a positive crankcase ventilation box, a water filter, an oil filter, an oil pump, a box comprising electronic components of a drive train, or a clutch housing.

Generally speaking, the silicone composition is applied to the component either in the form of a continuous or discontinuous seal or in the form of a continuous or discontinuous layer. To form a continuous or discontinuous layer, the conventional techniques of application or coating may be used.

According to one preferred embodiment, the polycondensation catalyst A is a nonsilylated organic compound conforming to the general formula (I), in which:

the identical or different radicals $R_1$ and the radical $R_3$ are selected independently of one another from the group consisting of an isopropyl radical, a cyclohexyl radical, and a linear or branched monovalent $C_1$-$C_{12}$ alkyl radical, the radical $R_2$ represents a hydrogen atom, a linear or branched monovalent alkyl group, a cycloalkyl group, an alkyl group substituted by a cyclic moiety which is substituted or unsubstituted and possibly comprises at least one heteroatom, an arylalkyl group, a fluoroalkyl group or an alkylamine or alkylguanidine group, and when the radical $R^2$ is not a hydrogen atom, the radicals $R^2$ and $R^3$ may be joined to form a 3-, 4-, 5-, 6- or 7-membered aliphatic cyclic moiety which is optionally substituted by one or more substituents.

According to one preferred embodiment, the polycondensation catalyst A is a nonsilylated organic compound selected from the group consisting of the following compounds (A1) to (A6):

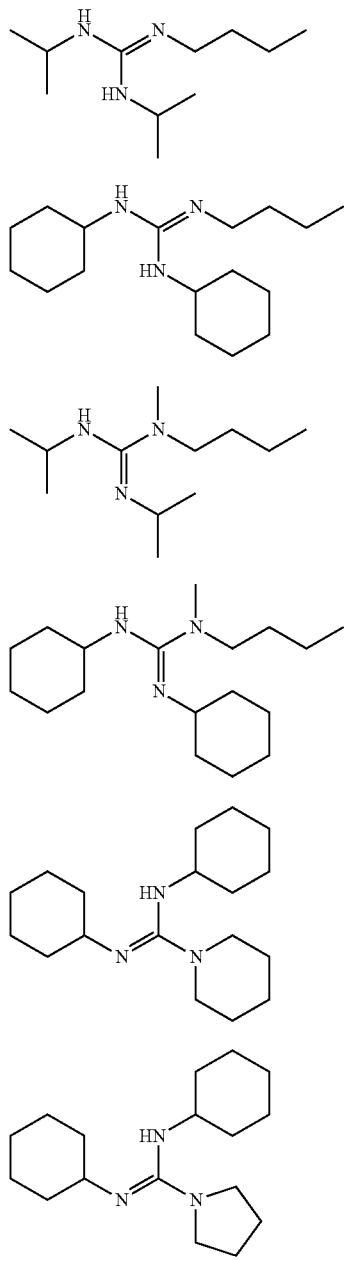

According to one even more preferred embodiment, the polycondensation catalyst A is a nonsilylated organic compound selected from the group consisting of compounds (A2), (A3), and (A4) described above.

The catalysts in accordance with the present invention are not reproductively toxic, unlike the alkyltin-based catalysts. Moreover, both for one-component or two-component compositions, they allow gaskets to be obtained that exhibit enhanced resistance to the fluids used in drive trains, relative to those obtained from conventional compositions containing titanium or alkyltin-based catalysts.

The amount of polycondensation catalysts A according to the invention is generally between 0.1% and 10% by weight, relative to the total weight of the composition, preferably between 0.1 and 5%, for either a one-component or a two-component preparation.

Description of the Silicone Base B:

In the remainder of the present application, a conventional description will be given of the linear polyorganosiloxanes, the branched structure polyorganosiloxanes, and the polyorganosiloxane resins by means of the following customary notations, which are used to designate different siloxy units of formula M, D, T, and Q below:

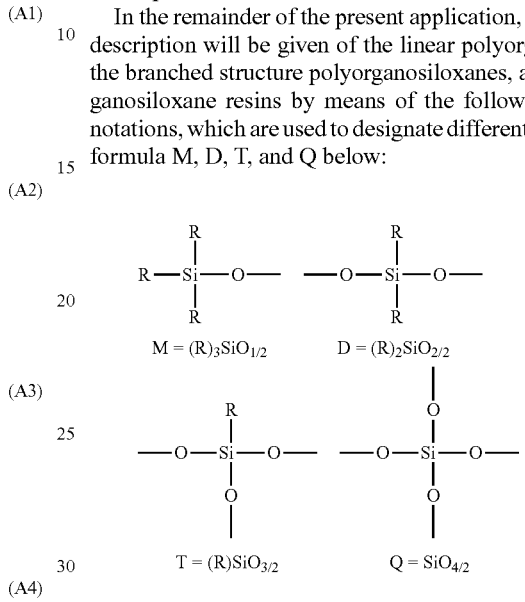

In these formulae, R may represent various saturated or unsaturated hydrocarbon groups, especially aromatic groups, which are optionally substituted by heteroatoms, and also nonhydrocarbon groups.

Conventionally, in this notation, the oxygen atoms are shared between two silicon atoms. Conventionally, a particular group R is indicated by citing it as a superscript after the symbol M, D or T. For example, $M^{OH}$ represents an M unit in which one group R is a hydroxyl group —OH.

The term "substantially linear" should be understood to mean a POS oil composed of D siloxy units and further comprising T siloxy units and/or Q siloxy units, the number of T and Q siloxy units being less than or equal to one per hundred silicon atoms.

The silicone bases used in the present invention, which crosslink and cure by polycondensation reactions, are well-known. The expression "polyorganosiloxane oil crosslinkable by polycondensation reaction" does not include the organic polymers having silicon-containing groups which are crosslinkable by polycondensation, such as those described, for example, in patent application EP-A1-1 985666 at page 4, lines 7 to 52.

The silicone bases according to the invention are described in detail more particularly in numerous patents and they are available commercially.

These silicone bases may be one-component bases, hence contained in a single pack, which are stable on storage in the absence of moisture and can be cured in the presence of moisture, more particularly moisture provided by the ambient air or by water generated within the base on its use.

Further to one-component bases, it is possible to use two-component bases, hence bases contained in two packs, which cure when the two parts are mixed. They are packaged after incorporation of the catalyst in two separate fractions, it being possible for one of the fractions to contain, for example, only the catalyst according to the invention or a mixture with the crosslinking agent.

According to another preferred embodiment, the polyorganosiloxane composition X according to the invention as described above is characterized in that it further comprises a catalytically effective amount of at least one polycondensation catalyst A according to the invention, and as defined in the present application, and a silicone base B comprising:
- at least one polyorganosiloxane oil C capable of crosslinking by polycondensation to give an elastomer;
- optionally at least one crosslinking agent D;
- optionally at least one adhesion promoter E; and
- optionally at least one nonsiliceous, organic and/or siliceous inorganic filler F.

According to one particularly preferred embodiment, the polyorganosiloxane composition X which is crosslinkable to elastomer by polycondensation reactions comprises:
- per 100 parts by weight of at least one polyorganosiloxane oil C capable of crosslinking by polycondensation, which is a reactive α,ω-dihydroxydiorganopolysiloxane polymer in which the organic radicals are hydrocarbon radicals preferably selected from the group consisting of: alkyls having from 1 to 20 carbon atoms; cycloalkyls having from 3 to 8 carbon atoms; alkenyls having from 2 to 8 carbon atoms; and cycloalkenyls having from 5 to 8 carbon atoms;
- from 0.1 to 60 parts by weight of at least one crosslinking agent D selected from the group consisting of polyalkoxysilanes and the products originating from the partial hydrolysis of a polyalkoxysilane;
- from 0 to 60 parts by weight of an adhesion promoter E as described below;
- from 0 to 250 parts by weight, preferably from 5 to 200 parts by weight, of at least one nonsiliceous, organic and/or siliceous inorganic filler F;
- from 0 to 10 parts by weight of water,
- from 0 to 100 parts by weight of at least one nonreactive linear polyorganosiloxane polymer G consisting of a linear homopolymer or copolymer in which, per molecule, the mutually identical or different monovalent organic substituents bonded to the silicon atoms are selected from alkyl, cycloalkyl, alkenyl, aryl, alkylarylene, and arylalkylene radicals,
- from 0 to 20 parts by weight of a coloring base or of a colorant H,
- from 0 to 70 parts by weight of polyorganosiloxane resins I, and
- from 0 to 20 parts of auxiliary additives J known to the skilled person, such as plasticizers, organic diluents, crosslinking retarders, mineral oils, antimicrobial agents, and heat stabilizer additives such as titanium oxides, iron oxides or cerium oxides, and
- from 0.1 to 50 parts by weight of at least one polycondensation catalyst A according to the invention and as defined in the present application.

According to another preferred embodiment, the polyorganosiloxane oil C has functionalized end groups of alkoxy type and is prepared in situ by reacting, in the presence of a catalytically effective amount of lithium hydroxide, a branched polydimethylsiloxane having hydroxyl groups bonded to a silicon atom, and of general formula $M_xD_yQ_z$ (where x, y, and z are integers), or a linear diorganopolysiloxane, comprising a hydroxyl group bonded to a silicon atom at each chain end, with at least one polyalkoxysilane of formula (II) below:

$$(R^4)_c(R^5)_a Si(OR^6)_{4-(a+c)} \quad \text{(II)}$$

in which:
- a is 0, 1 or 2,
- c is 0, 1 or 2,
- the sum a+c is equal to 0, 1 or 2,
- $R^4$ represents an aliphatic, cyclanic or aromatic, substituted or unsubstituted, and saturated or unsaturated monovalent $C_1$ to $C_{13}$ hydrocarbon radical, it being possible for $R^4$ to be identical to $R^5$,
- $R^5$ represents an aliphatic, cyclanic or aromatic, substituted or unsubstituted, and saturated or unsaturated $C_1$ to $C_{13}$ monovalent hydrocarbon radical, which may comprise an epoxy, primary, secondary or tertiary amine, or mercapto function, and
- $R^6$ represents an aliphatic organic radical having from 1 to 8 carbon atoms which is selected in particular from alkyl radicals, alkyl ether radicals, alkyl ester radicals, alkyl ketone radicals, alkylcyano radicals, and aralkyl radicals having from 7 to 13 carbon atoms, it being understood that the alkoxy groups of the silane of formula (II) may each have a different meaning for $R^6$, or the same meaning.

According to another preferred embodiment, the polyorganosiloxane oil C is preferably an α,ω-dihydroxypolydiorganosiloxane polymer with a viscosity of between 50 and 5 000 000 mPa·s at 25° C., and the crosslinking agent D is preferably an organosilicon compound bearing more than two hydrolyzable groups bonded to the silicon atoms per molecule.

The polyorganosiloxane oil C may also be functionalized at its ends with hydrolyzable radicals, obtained by condensing a precursor bearing hydroxyl functions with a crosslinking silane which bears hydrolyzable radicals (or by hydrosilylation of terminal ≡SiVinyl or ≡SiH functions). Branched polyorganosiloxanes may also be contemplated, optionally comprising alkylsilyl groups within the chain and/or at the chain end, these being polyorganosiloxanes having groups that are capable of reacting by polycondensation reactions within the chain and/or at the chain end, and "inter-chain" alkyl groups connecting two polyorganosiloxane chains to one another.

The crosslinking agents D are products which are available on the silicones market; moreover, their use in compositions which cure from ambient temperature is known; it features, in particular, in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799, and FR-A-2 067 636.

The crosslinking agent D has at least one hydrolyzable group such as:
- acyloxy of formula —O—CO—R'
- alkoxy of formula —O—R'
- amino of formula —NR$^1$R$^2$
- amido of formula —NR$^1$COR$^2$
- alkenyloxy of formula —O—CR$^1$═CHR$^2$
- aminoxy of formula —O—NR$^1$R$^2$
- ketiminoxy of formula —O—N═CR$^1$R$^2$ or

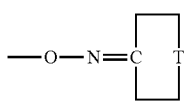

where R' represents an alkyl or aryl radical having from 1 to 15 carbon atoms, $R^1$ and $R^2$, which are identical or different, represent alkyl or aryl radicals containing from 1 to 8 carbon atoms, and T is an alkylene radical containing from 4 to 8 carbon atoms. The radicals R', $R^1$, and $R^2$ include, very particularly, the following radicals: methyl, ethyl, cyclohexyl, and phenyl. Among the radicals T, mention may be made very particularly of those of formula: —$(CH_2)_4$—, —$(CH_2)_5$—, and —$(CH_2)_6$—.

Examples of alkoxysilanes include those of formula:
$Si(OCH_3)_4$
$Si(OCH_2CH_3)_4$
$Si(OCH_2CH_2CH_3)_4$
$(CH_3O)_3SiCH_3$
$(C_2H_5O)_3SiCH_3$
$(CH_3O)_3Si(CH=CH_2)$
$(C_2H_5O)_3Si(CH=CH_2)$
$(CH_3O)_3Si(CH_2—CH=CH_2)$
$(CH_3O)_3Si[CH_2—(CH_3)C=CH_2]$
$(C_2H_5O)_3Si(OCH_3)$
$Si(OCH_2—CH_2—OCH_3)_4$
$CH_3Si(OCH_2—CH_2—OCH_3)_3$
$(CH_2=CH)Si(OCH_2CH_2OCH_3)_3$
$C_6H_5Si(OCH_3)_3$
$C_6H_5Si(OCH_2—CH_2—OCH_3)_3$.

The ketiminoxysilane crosslinkers have been known for a long time. They are, for example, described in French patents FR-A-1 314 649 and FR-A-1 371 250, in U.S. Pat. No. 3,678,003 and U.S. Pat. No. 3,986,999, in U.K. patent GB-A-1 468 467, in Belgian patent BE-A-901 479, and in European patent EP-A-157 580.

Examples of ketiminoxysilanes include those of formula:
$CH_3Si[—O—N=C(CH_3)_2]_3$,
$CH_3Si[—O—N=C(CH_3)C_2H_5]_3$,
$CH_2=CHSi[—O—N=C(CH_3)C_2H_5]_3$,
$C_6H_5Si[—O—N=C(CH_3)_2]_3$,
$CH_3Si[—O—N=C(C_2H_5)(CH_2)_3CH_3]_3$
$(CH_3)_2C=N—O—)Si[—O—N=C(CH_3)C_2H_5]_3$,
$CH_3Si[—O—N=C(CH_3CH(C_2H_5)(CH_2)_3CH_3]_3$,
$CH_3Si[—O—N=C(CH_3CH(C_2H_5)(CH_2)_3CH_3]_3$,

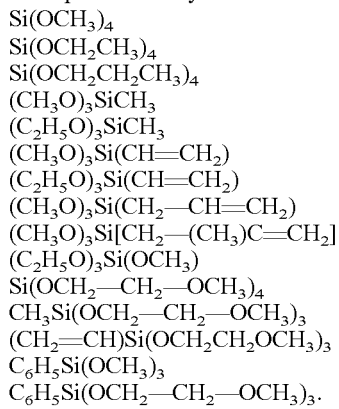

The acyloxysilane crosslinkers have been well-known for a long time. They are described in particular in U.S. Pat. No. 3,077,465, U.S. Pat. No. 3,382,205, U.S. Pat. No. 3,701,753, U.S. Pat. No. 3,957,714, U.S. Pat. No. 4,115,356, U.S. Pat. No. 4,273,698, FR-A-2 429 811, and FR-A-2 459 820.

Examples of acyloxysilanes include those of formula:
$CH_3Si(OCOCH_3)_3$,
$C_2H_5Si(OCOCH_3)_3$,
$CH_2=CHSi(OCOCH_3)_3$
$C_6H_5Si(OCOCH_3)_3$,
$CH_3Si[OCOCH(C_2H_5)—(CH_2)_3—CH_3]$
$CF_3CH_2CH_2Si(OCOC_6H_5)_3$
$CH_3Si(OCOCH_3)_2[OCOH(C_2H_5)—(CH_2)_3—CH_3]$
$CH_3COOSi[OCOCH(C_2H_5)—(CH_2)_3—CH_3]$ Other examples of crosslinking agent D include the following:
the silanes and the products of partial hydrolysis of this silane, of the following general formula:

$R^1{}_kSi(OR^2)_{(4-k)}$ in which:
the symbols $R^2$, which are identical or different, represent alkyl radicals having from 1 to 8 carbon atoms, such as methyl, ethyl, propyl, butyl, pentyl, and 2-ethylhexyl radicals; and $C_3$-$C_6$ oxyalkylene radicals, and
the symbol $R^1$ represents a linear or branched, saturated or unsaturated aliphatic hydrocarbon group, or a saturated or unsaturated and/or aromatic, monocyclic or polycyclic carbocyclic group, and k is 0, 1 or 2; and Among the crosslinking agents D, preference is given more particularly to alkoxysilanes, ketiminoxysilanes, alkyl silicates, and polyalkyl silicates in which the organic radicals are alkyl radicals having from 1 to 4 carbon atoms.

Other examples of crosslinking agent D include polyethyl silicate or poly-n-propyl silicate.

Generally speaking, from 0.1 to 60 parts by weight of crosslinking agent D are used per 100 parts by weight of polyorganosiloxane C which is capable of crosslinking by polycondensation to give an elastomer.

Accordingly, the composition according to the invention may comprise at least one adhesion promoter E such as, for example, the organosilicon compounds bearing both:
(1) one or more hydrolyzable groups bonded to the silicon atom, and
(2) one or more organic groups substituted by radicals comprising one or more nitrogen atoms, heteroatoms S or O) of mercaptan, urea or isocyanurate groups) or selected from the group of (meth)acrylate, epoxy, and alkenyl radicals, and more preferably still from the group consisting of the following compounds, taken alone or as a mixture: vinyltrimethoxysilane (VTMO), 3-glycidyloxypropyltrimethoxysilane (GLYMO), methacryloyloxypropyltrimethoxysilane (MEMO),
$[H_2N(CH_2)_3]Si(OCH_2CH_2CH_3)_3$,
$[H_2N(CH_2)_3]Si(OCH_3)_3$
$[H_2N(CH_2)_3]Si(OC_2H_5)_3$
$[H_2N(CH_2)_4]Si(OCH_3)_3$
$[H_2NCH_2CH(CH_3)CH_2CH_2]SiCH_3(OCH_3)_2$
$[H_2NCH_2]Si(OCH_3)_3$
$[n-C_4H_9—HN—CH_2]Si(OCH_3)_3$
$[H_2N(CH_2)_2NH(CH_2)_3]Si(OCH_3)_3$
$[H_2N(CH_2)_2NH(CH_2)_3]Si(OCH_2CH_2OCH_3)_3$
$[CH_3NH(CH_2)_2NH(CH_2)_3]Si(OCH_3)_3$
$[H(NHCH_2CH_2)_2NH(CH_2)_3]Si(OCH_3)_3$
$HS(CH_2)_3Si(OCH_3)_3$
$NH2CONH2(CH_2)_3Si(OCH_3)_3$

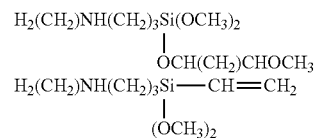

or polyorganosiloxane oligomers containing such organic groups in an amount of more than 20%.

These one-component bases may be admixed with adhesion promoters E selected, for example, from organosilicon compounds bearing both, on the one hand, organic groups substituted by radicals selected from the group of amino, ureido, isocyanate, epoxy, alkenyl, isocyanurate, hydentoil, guanidino, and mercaptoester radicals, and, on the other hand, hydrolyzable groups, generally alkoxy groups, bonded to the silicon atoms.

Examples of such adhesion agents are described in the U.S. Pat. No. 3,517,001, U.S. Pat. No. 4,115,356, U.S. Pat. No. 4,180,642, U.S. Pat. No. 4,273,698, and U.S. Pat. No. 4,356, 116 and in the European patents EP 31 996 and EP 74 001.

For the one-component and two-component bases, use is made, as inorganic fillers F, of very finely divided products for which the average particle diameter is less than 0.1 µm. These fillers include fumed silicas and precipitated silicas; their BET specific surface area is generally greater than 40 m$^2$/g. These fillers may also take the form of more coarsely divided products, having an average particle diameter of greater than 0.1 µm. Examples of such fillers include ground quartz, diatomaceous silicas, calcium carbonate, optionally surface-treated with an organic acid or with an ester of an organic acid, calcined clay, rutile titanium oxide, iron, zinc, chromium, zirconium, and magnesium oxides, the various forms of alumina (hydrated or unhydrated), boron nitride, lithopone, barium metaborate, barium sulfate, and glass microbeads; their specific surface area is generally less than 30 m$^2$/g.

These fillers may have been surface modified by treatment with the various organosilicon compounds commonly employed for this purpose. Accordingly, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885, and FR-A-1 236 505, U.K. patent GB-A-1 024 234). In most cases, the treated fillers contain from 3% to 30% of their weight of organosilicon compounds. The fillers may be composed of a mixture of two or more types of fillers with different particle size; thus, for example, they may be composed of 30% to 70% of finely divided silicas with a BET specific surface area of greater than 40 m$^2$/g, and of 70% to 30% of more coarsely divided silicas with a specific surface area of less than 30 m$^2$/g. These fillers may have been surface-treated.

The purpose of introducing fillers is to confer good mechanical and rheological characteristics on the elastomers that result from the curing of the compositions in accordance with the invention.

In combination with these fillers, it is possible to use organic and/or inorganic pigments and also agents that enhance the heat resistance (salts and oxides of rare earths, such as cerium oxides and hydroxides) and/or the flame resistance of the elastomers. Use may be made, for example, of the cocktails of oxides that are described in international application WO 98/29488. The agents which enhance the flame resistance include halogenated organic derivatives, organic phosphorus derivatives, platinum derivatives such as chloroplatinic acid (its products of reaction with alkanols and ether oxides), and platinous chloride-olefin complexes. These pigments and agents together represent not more than 20% of the weight of the fillers.

Other usual additives and auxiliary agents may be incorporated into the composition according to the invention; they are selected according to the applications in which said compositions are used.

The silicone base which is used for producing the composition according to the invention may comprise:

100 parts of polyorganosiloxane oil C capable of crosslinking by polycondensation to give an elastomer;
0 to 20 parts of a crosslinking agent D;
0 to 20 parts of an adhesion promoter E; and
0 to 50 parts of filler F.

Further to the principal constituents, nonreactive linear polyorganosiloxane polymers G may be introduced for the purpose of influencing the physical characteristics of the compositions in accordance with the invention and/or the mechanical properties of the elastomers resulting from the curing of these compositions.

These nonreactive linear polyorganosiloxane polymers G are well-known; they comprise, more particularly: α,ω-bis(triorganosiloxy)diorganopolysiloxane polymers with viscosities of at least 10 mPa·s at 25° C., formed essentially from diorganosiloxy units and from not more than 1% of monoorganosiloxy and/or siloxy units, the organic radicals bonded to the silicon atoms being selected from methyl, vinyl, and phenyl radicals, at least 60% of these organic radicals being methyl radicals and not more than 10% being vinyl radicals. The viscosity of these polymers may reach a number of tens of millions of mPa·s at 25° C.; they therefore include oils with a fluid to viscous appearance, and soft to hard gums. They are prepared according to the usual techniques, which are described more specifically in French patents FR-A-978 058, FR-A-1 025 150, FR-A-1 108 764, and FR-A-1 370 884. Preference is given to using α,ω-bis(trimethylsiloxy)dimethylpolysiloxane oils with a viscosity of from 10 mPa·s to 1000 mPa·s at 25° C. These polymers, which act as plasticizers, may be introduced in a proportion of not more than 70 parts, preferably from 5 to 20 parts, per 100 parts of polyorganosiloxane oil C capable of crosslinking by polycondensation.

The compositions according to the invention may further advantageously comprise at least one silicone resin H. These silicone resins are branched organopolysiloxane polymers which are well known and available commercially. They exhibit, per molecule, at least two different units selected from those of formula R'''$_3$SiO$_{1/2}$ (M unit), R'''$_2$SiO$_{2/2}$ (D unit), R'''SiO$_{3/2}$ (T unit), and SiO$_{4/2}$ (Q unit). The radicals R''' are identical or different and are selected from linear or branched alkyl radicals having from 1 to 10 carbon atoms, and vinyl, phenyl, and 3,3,3-trifluoropropyl radicals. The alkyl radicals preferably have from 1 to 6 carbon atoms inclusive. More particularly, mention may be made as alkyl radicals R of methyl, ethyl, isopropyl, tert-butyl, and n-hexyl radicals.

Examples of resins include the MQ resins, the MDQ resins, the DT resins, and the MDT resins.

In order to produce the compositions in accordance with the invention, it is necessary, in the case of the one-component compositions, to use equipment which allows the various fundamental constituents to be intimately mixed in a moisture-free environment, with and without supply of heat, these fundamental constituents being optionally admixed with the aforementioned adjuvants and additives. It is possible first of all to mix the organopolysiloxane oils C and the fillers F, and then to add to the resulting paste the crosslinkers D, the compounds E, and the catalyst according to the invention. It is also possible to mix the oils C, the crosslinkers D, the compounds E, and the fillers F, and subsequently to add the catalyst according to the invention. During these operations, the mixtures can be heated at a temperature within the range 50-180° C. under atmospheric pressure or under a reduced pressure in order to promote the removal of volatile materials.

According to one version, silicone oils with alkoxy units are prepared in situ by a functionalization reaction of an α,ω-dihydroxypolydimethylsiloxane oil by reaction with a silane or a polyalkoxysilane in the presence of a catalytically effective amount of lithium hydroxide (process described in patent application FR-2638752).

The one-component compositions in accordance with the invention, used as they are, i.e., undiluted, or in the form of dispersions in diluents, are stable on storage in the absence of water, and cure from low temperatures (following removal of the solvents in the case of the dispersions) in the presence of water to form elastomers.

Following the application of the compositions as they are to solid substrates, in a humid atmosphere, a process of curing to elastomer is observed, taking place from the outside to the inside of the material applied. A skin forms first at the surface, and then the crosslinking continues in depth. Complete formation of the skin, which results in a tack-free feel to the surface, requires a time period of several minutes, this period being dependent on the degree of relative humidity of the atmosphere surrounding the compositions and on the crosslinkability of said compositions.

The production of the two-component compositions in accordance with the invention takes place likewise by mixing of the various constituents in appropriate apparatus. To obtain homogeneous compositions, it is preferable first to mix the polymers A with the fillers C; the whole mixture can be heated for at least 30 minutes at a temperature of more than 80° C., so as to complete the wetting of the fillers by the oils. The resulting mixture, brought preferably to a temperature of less than 80° C., of the order of the ambient temperature, for example, may be admixed with the other constituents, namely the crosslinking agents, the catalyst, and, optionally, various additives and adjuvants, and even water.

According to another particularly preferred embodiment, the polyorganosiloxane composition X crosslinkable to elastomer by polycondensation reactions is prepared from a two-component system which takes the form of two separate parts P1 and P2, which are intended to be mixed to form said composition X, with one of these parts comprising the polycondensation catalyst A according to the invention, and as described in the present application, and the crosslinking agent D, whereas the other part is devoid of the aforementioned species and comprises:

per 100 parts by weight of the polyorganosiloxane oil or oils C capable of crosslinking by polycondensation to form an elastomer, and
from 0.001 to 10 part(s) by weight of water.

According to another particularly preferred embodiment, the polyorganosiloxane composition X crosslinkable to elastomer by polycondensation reactions is prepared from a one-component system which is stable on storage in the absence of moisture and which crosslinks to an elastomer in the presence of water, comprises:

at least one crosslinkable linear polyorganosiloxane oil C having functionalized alkoxy, oxime, acyl and/or enoxy, preferably alkoxy, end groups,
at least one crosslinking agent D,
at least one filler F, and
at least one catalyst of the polycondensation reaction, which is the polycondensation catalyst A according to the invention and as described in the present application.

One-component bases are described in detail, for example, in patents EP 141 685, EP 147 323, EP 102 268, EP 21 859, FR 2 121 289, and FR 2 121 631, cited in reference.

Two-component bases are described in detail, for example, in patents EP 118 325, EP 117 772, EP 10 478, EP 50 358, EP 184 966, U.S. Pat. No. 3,801,572, and U.S. Pat. No. 3,888, 815, cited as reference.

According to one particularly advantageous embodiment of the invention, the polyorganosiloxane composition X which is crosslinkable to elastomer by polycondensation reactions comprises a sufficient amount of at least one thixotropic agent K, so as to have thixotropic properties.

In the sense of the invention, a thixotropic silicone composition is a composition which exhibits thixotropy, defined as being a rheological behavior on the part of a material subjected to shear that leads to a progressive destructuring of said material. Thixotropy, therefore, is a reversible phenomenon allowing a composition to be obtained which is in gel form at rest and which undergoes liquefaction when it is subjected to stirring or shearing. A thixotropic material, accordingly, undergoes a reduction in its viscosity when the shearing applied to it is increased, and returns to the initial viscosity conditions when shearing is no longer applied, after a certain time (see Rheology Handbook: "A Practical Guide to Rheological Additives", Rheox, Inc., 1998).

Adding a thixotropic agent K allows the rheology of the polyorganosiloxane compositions X that are crosslinkable to elastomer to be controlled, and more particularly allows said compositions to be endowed with a nonrunning viscoelastic behavior.

Thixotropic agents are well-known in the art. They include the various organic and inorganic thickeners that are commonly used in silicone compositions.

The thixotropic agent K according to the invention is preferably selected from the group consisting of:
inorganic thickeners, boric acid and borates, titanates, aluminates, and zirconates;
compounds bearing hydroxyl groups;
compounds based on polyethylene and/or polypropylene;
compounds comprising cyclic amine functions;
compounds of polyether type or comprising polyether groups; and
fluoro resins, preferably based on polyfluoroethylene (PFE) and more preferably still based on polytetrafluoroethylene (PTFE or Teflon®).

Compounds bearing hydroxyl groups include, in particular, hydrophilic silicones bearing hydroxyl groups, such as polydimethylsiloxanes or polymethylphenylsiloxanes or polydiphenylsiloxanes or copolymers thereof with terminal dimethylhydroxy groups, or hydroxylated silicone resins of "MDT" type.

Compounds based on polyethylene and/or polypropylene include crystalline polyethylene or polypropylene waxes optionally bearing fluorine-containing groups (Crayvallac®).

In the sense of the invention, a "fluoro resin" is any fluoropolymer containing C—F bonds (see, for example, "Encyclopedia of Chemical Technology"—$4^{th}$ edition, 1994, Vol. 11, pp. 621-721) such as, for example:
a polyvinyl fluoride,
a polyvinylidene fluoride,
a polytetrafluoroethylene (PTFE),
a polymonochlorotrifluoroethylene,
a polyfluoropolyether,
a copolymer of ethylene and tetrafluoroethylene,
a copolymer of tetrafluoroethylene and perfluorovinyl ether, and
a copolymer of perfluoroethylene and perfluoropropylene.

The invention further provides for the use of the polyorganosiloxane composition X crosslinkable to elastomer by polycondensation reactions and as defined above for preparing silicone gaskets having good resistance to aging in fluids used in a drive train.

Other advantages and features of the present invention will emerge more clearly from a reading of the examples given below by way of non-limiting illustration.

EXAMPLES

I) Preparation of the Catalysts According to the Invention a) 1-Butyl-2,3-diisopropylguanidine (A1)

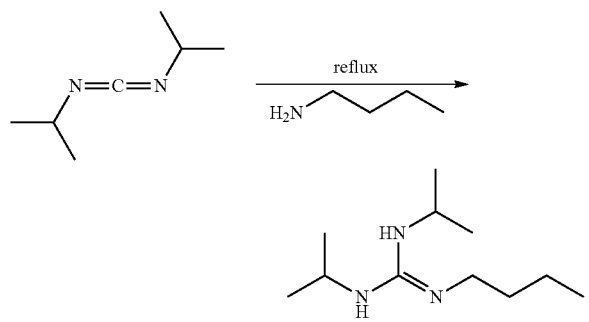

A mixture of 33 g of N-butylamine (0.45 mol) and 19 g of diisopropylcarbodiimide (0.15 mol) is heated at reflux for 3 hours 30 minutes. GC analysis then shows a conversion of more than 99.5% of the diisopropylcarbodiimide. The final mixture, which is colorless, is concentrated at 60° C. under 20 mbar for 2 hours, to give 29 g of a colorless and virtually odorless liquid of low viscosity, which corresponds to the expected guanidine (96.7% yield).

$^1$H NMR/CDCl$_3$ (ppm): 0.93 (3H, t), 1.14 (12H, d), 1.37 (2H, sex), 1.52 (2H, quint), 3.01 (2H, t), 3.57 (2H, m).

b) 1-Butyl-2,3-diisopropyl-1-methylguanidine (A3)

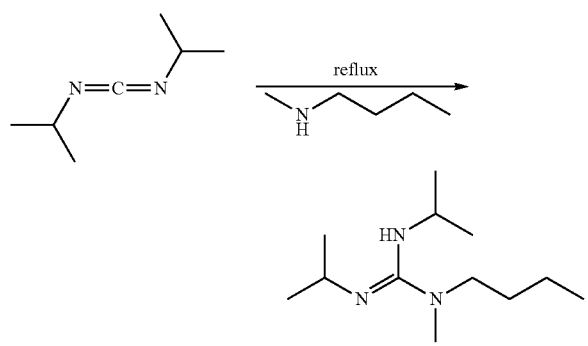

A mixture of 32.68 g of N-butyl-N-methylamine (0.375 mol) and 23.66 g of diisopropylcarbodiimide (0.1875 mol) is heated at reflux for 3 hours. GC analysis then shows a conversion of more than 99.5% of the diisopropylcarbodiimide. The final mixture, which is colorless, is concentrated at 60° C. under 5 mbar for 2 hours, to give 40 g of a colorless and virtually odorless liquid of low viscosity, which corresponds to the expected guanidine (100% yield).

$^1$H NMR/CDCl$_3$ (ppm): 0.88 (3H, t), 1.06 (12H, d), 1.26 (2H, sex), 1.46 (2H, quint), 2.67 (3H, s), 3.05 (2 H, t), 3.35 (2H, m).

c) 1-Butyl-2,3-dicyclohexylguanidine (A2)
CAS-RN=60006-40-8

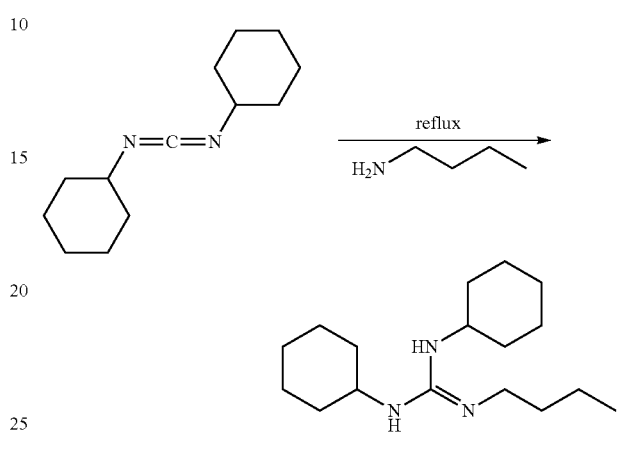

A mixture of 15.69 g of N-butylamine (0.214 mol) and 22.13 g of dicyclohexylcarbodiimide (0.107 mol) is heated at reflux for 2 hours. GC analysis then shows a conversion of more than 99.6% of the dicyclohexylcarbodiimide. The final mixture, which is colorless, is concentrated at 60° C. under 1 mbar for 2 hours, to give 29.7 g of a colorless and virtually odorless liquid of medium viscosity, corresponding to the expected guanidine (99% yield).

d) 1-Butyl-2,3-dicyclohexyl-1-methylguanidine (A4)

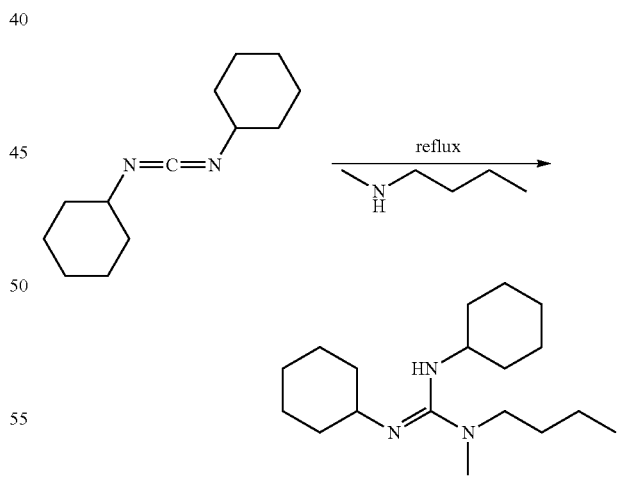

A mixture of 17.78 g of N-butyl-N-methylamine (0.204 mol) and 21.05 g of dicyclohexylcarbodiimide (0.102 mol) is heated at reflux for 3 hours. GC analysis then shows a conversion of more than 99.5% of the dicyclohexylcarbodiimide. The final mixture, which is colorless, is concentrated at 60° C. under 1 mbar for 2 hours, to give 29.9 g of a colorless and virtually odorless liquid of medium viscosity, corresponding to the expected guanidine (99.7% yield).

¹H NMR/CDCl₃ (ppm): 0.89 (3H, t), 1-1.4 (10H, m), 1.47 (2H, quint), 1.5-2 (12H, several m), 2.67 (3H, s), 2.90 (1H, m), 2.97 (1H, m), 3.06 (2H, t)

e) 1,2-Dicyclohexyl-3-piperidylguanidine (A5)
CAS-RN=60006-25-9

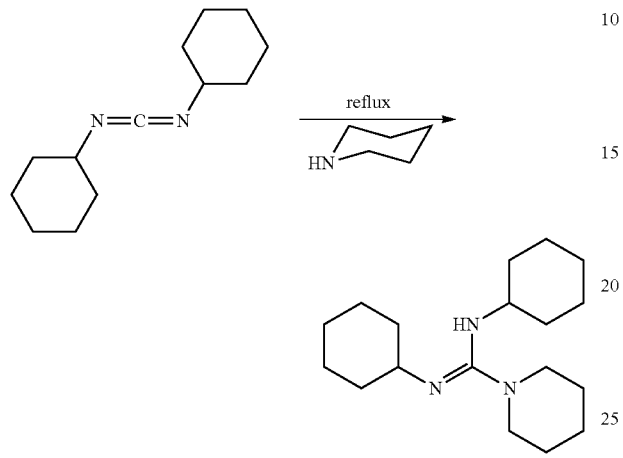

A mixture of 11.69 g of piperidine (0.137 mol) and 14.16 g of dicyclohexylcarbodiimide (0.0686 mol) is heated at reflux for 3 hours 30 minutes. GC analysis then shows a conversion of more than 99.7% of the dicyclohexylcarbodiimide. The final mixture, which is colorless, is concentrated at 60° C. under 1 mbar for 2 hours, to give 19.9 g of a colorless and virtually odorless liquid of very high viscosity, corresponding to the expected guanidine (99.5% yield).

f) 1,2-Dicyclohexyl-3-pyrrolidylguanidine (A6)
CAS-RN=60006-28-2

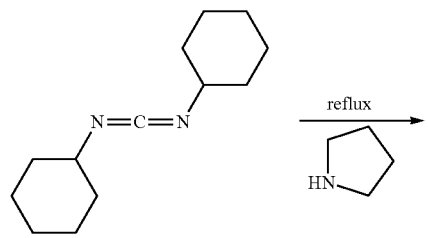

A mixture of 19.2 g of pyrrolidine (0.27 mol) and 18.6 g of dicyclohexylcarbodiimide (0.09 mol) is heated at reflux for 4 hours. GC analysis then shows a conversion of more than 99.8% of the dicyclohexylcarbodiimide. The final mixture, which is colorless, is concentrated at 60° C. under 1 mbar for 1 hour, to give 24.9 g of a colorless and virtually odorless liquid of medium viscosity, corresponding to the expected guanidine (99.6% yield).

II) Preparation of One-Component Compositions—Paste Test—Vinyltrimethoxysilane Crosslinker The paste used is prepared as follows: a mixture of 3464 g of an α,ω-dihydroxy oil with a viscosity of 20 000 centipoises, containing 0.066% of OH, and 120 g of vinyltrimethoxysilane is admixed, with stirring, with 16 g of a 2% by weight solution of lithium hydroxide in methanol, and then, after 5 minutes, 400 g of AE55 fumed silica are added. The mixture is devolatilized under vacuum and then stored in a moisture-free environment.

For each test, the catalyst under test is mixed with 50 g of this paste, and then the catalytic potential is evaluated in 3 ways:
- the skinover time (SOT), the time after which surface crosslinking is observed, on a 2 mm film;
- the persistence of a tacky feel at 48 hours;
- the hardness (Shore A hardness) of a bead 6 mm thick under controlled conditions (23° C. and 50% relative humidity) and over increasing times (2, 3, 4, 7, and days), and also after 7 days (7 d) at ambient temperature (AT) followed by 7 days at 100° C. In the results tables, the symbol ">" corresponds to the hardness values measured on the upper part of the bead, and the symbol "<" corresponds to the hardness values measured on the lower part of the bead, which is less exposed to the ambient air than the upper part.

Various catalysts according to the invention were tested. For comparison, as before, the following were also tested:
- a tin-based catalyst: dibutyltin dilaurate (DBTDL), and
- 1,1,3,3-tetramethylguanidine (TMG), which is described in international application WO 2004/020525. The results are indicated in Table I below:

TABLE I

| Reference | Structure | mol/Sn | % by weight | SOT stick min | Tacky feel at 48 hrs | Shore A hardness over 6 mm | | | | | | | | | | | |
|---|---|---|---|---|---|---|---|---|---|---|---|---|---|---|---|---|
| | | | | | | 2d > | 2d < | 3d > | 3d < | 4d > | 4d < | 7d > | 7d < | 14d > | 14d < | 7d AT + 7d 100° C. > | 7d AT + 7d 100° C. < |
| Comparative (DBTDL) | | 1 | 0.88 | 10 | no | 34 | 26 | 35 | 30 | 35 | 30 | 35 | 29 | 35 | 30 | 35 | 28 |

TABLE I-continued

| Reference | Structure | mol/Sn | % by weight | SOT stick min | Tacky feel at 48 hrs | Shore A hardness over 6 mm |||||  |
|---|---|---|---|---|---|---|---|---|---|---|---|
| | | | | | | 2d >< | 3d >< | 4d >< | 7d >< | 14d >< | 7d AT + 7d 100° C. >< |
| Comparative (TMG) | *structure: tetramethylguanidine* | 4 | 0.64 | 2 | yes | 2 1 | 2 1 | / | 4 3 | 2 1 | 1 1 |
| Inventive (A1) | *structure: 1,2,3-triisopropyl/butyl guanidine* | 3 | 0.84 | 1 | no | 36 26 | 36 28 | 37 28 | 38 28 | 38 30 | 34 27 |
| | | 1.5 | 0.42 | 2 | no | 35 22 | 36 26 | 36 27 | 37 28 | 39 28 | 36 26 |
| | | 0.75 | 0.21 | 2 | yes | 30 4 | 32 6 | 33 9 | 35 14 | 37 21 | 35 21 |
| Inventive (A2) | *structure: dicyclohexyl butyl guanidine* | 1.5 | 0.59 | 1 | no | 34 27 | 35 28 | 35 30 | 36 30 | 37 31 | 31 25 |
| Inventive (A3) | *structure: tetrasubstituted guanidine* | 3 | 0.9 | 3 | no | 35 27 | 36 29 | 36 29 | 35 29 | 37 31 | 37 30 |
| | | 1.5 | 0.46 | 5 | no | 35 21 | 37 28 | 37 30 | 37 30 | 39 31 | 37 31 |
| | | 0.75 | 0.23 | 6 | yes | 31 12 | 33 21 | 35 24 | 36 27 | 39 30 | 37 27 |
| | | 0.375 | 0.11 | 12 | yes | 22 4 | 26 6 | 28 10 | 28 13 | 32 23 | 31 21 |
| Inventive (A4) | *structure: tetrasubstituted guanidine with cyclohexyl groups* | 0.75 | 0.31 | 5 | no | 35 24 | 36 28 | 37 29 | 37 29 | 37 30 | 37 30 |
| | | 0.375 | 0.15 | 7 | no | 30 13 | 32 19 | 33 23 | 34 26 | 35 28 | 35 29 |

1,1,3,3-Tetramethylguanidine (TMG) does not allow crosslinking of the silicone oil, even at molar concentrations much higher than the guanidines according to the invention (A1) to (A4). The 1,2,3-trisubstituted guanidines (A1) and (A2) result in very short skinover times and in elastomers. The 1,2,3,3-tetrasubstituted guanidines (A3) and (A4) make it possible not only, by adapting the amounts to very low values, to modulate the durations of the skinover times, but also to obtain elastomers which have high thermal stability and slightly higher levels of crosslinking than with the tin catalyst (DBTDL). These results show that the catalysts according to the invention (A1) to (A4), which are nontoxic, result in more effective catalysis than the tin-based catalysts (DBTDL) and than tetramethylguanidine (TMG). The catalysts according to the invention may therefore advantageously replace the existing catalysts.

XI) Tests 1 Oil Resistance

A test paste used is prepared as follows: a mixture of 3464 g of an α,ω-dihydroxy polydimethylsiloxane oil with a viscosity of 20 000 centipoises, containing 0.066% of OH, and 120 g of vinyltrimethoxysilane is admixed, with stirring, with 16 g of a 2% by weight solution of lithium hydroxide in methanol, and then, after 5 minutes, 400 g of AE55 fumed silica are added. The catalyst under test is then added in an amount of x % by weight, and the mixture is subsequently devolatilized under vacuum prior to cartridge filling.

Joints in the form of films 2 mm thick are prepared from the test formulations and beforehand are crosslinked in a chamber conditioned to 23° C. and to 50% humidity for 14 days. In each case, three square specimens cut from the joints, with their Shore A hardness measured beforehand, are introduced into a 150 ml glass flask filled with 5W30 diesel oil (distributed by the company Total). After heating at 150° C. for 3 days and return to ambient temperature, the specimens are wiped with absorbent paper and the Shore A hardness is measured by means of a Zwick durometer.

The following three guanidines were tested:
The following three guanidines were tested:

(A2)
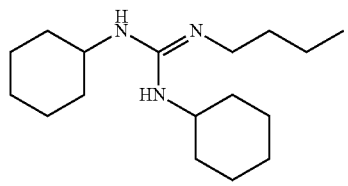

(A3)
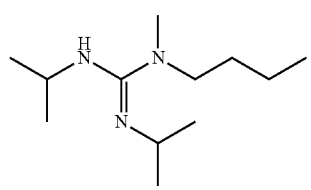

(A4)
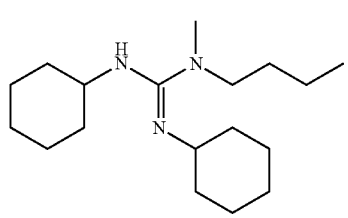

and also the following "conventional" condensation catalysts:
DBTDL: dibutyltin dilaurate
Amino silane: N-☐-aminoethyl-☐-aminopropylmethyl dimethoxysilane
PITA SM: titanium bis(ethylacetylacetato)diisopropoxide
TBOT: titanium tetra(butoxide)
The results obtained are set out in Table II below:

IV) Test 2 Oil Resistance

IV-1) Formulations are prepared in accordance with a procedure which is described in paragraphs a) to g) below:
a) Formulation 1 with Catalyst (A3)—Inventive A mixer equipped with a butterfly-type stirrer is charged with 1035 g of α,ω-dihydroxy polydimethylsiloxane oil with a viscosity of 20 000 mPa·s at 23° C. and 36 g of vinyltrimethoxysilane (VTMO). This mixture is homogenized by rotation of the "butterfly" at 200 rpm for 2 minutes. Next, 4.8 g of a functionalization catalyst based on lithium hydroxide monohydrate in solution in methanol are added over 30 seconds. This is followed by a homogenization phase of 4 minutes at 400 rpm. Then 120 g of D4 treated silica are incorporated at a moderate stirring speed of 160 rpm and are dispersed for a further 4 minutes at 400 rpm. The mixture then undergoes a degassing phase of 8 minutes under partial vacuum of 50 mbar and with stirring at 130 rpm, after which 3.6 g of di(isopropyl)methylbutylguanidine (A3) are added under nitrogen and dispersed at 400 rpm for 5 minutes. The mixture undergoes a second degassing phase of 3 minutes under 40 mbar and with stirring at 130 rpm. Lastly, the mixture is transferred to closed plastic cartridges.

b) Formulation 2 with Catalyst (A4)—Inventive

The procedure followed is the same as that described for formulation 1, but 3.6 g of di(cyclohexyl)methyl butylguanidine (A4) are added instead of the di(isopropyl)methylbutylguanidine (A3).

c) Formulation 3 with Catalyst (A4)—Inventive

A mixer equipped with a butterfly-type stirrer is charged with 908 g of α,ω-dihydroxy polydimethylsiloxane oil with a viscosity of 20 000 mPa·s at 23° C. and 24 g of vinyltrimethoxysilane (VTMO). This mixture is homogenized by rotation of the "butterfly" at 200 rpm for 2 minutes. Next, 4.8 g of a functionalization catalyst based on lithium hydroxide monohydrate in solution in methanol are added over 30 seconds. This is followed by a homogenization phase of 4 minutes at 400 rpm. Then 108 g of silica treated with octamethylcyclotetrasiloxane (D4) are incorporated at a moderate stirring speed of 160 rpm and are dispersed for a further 4 minutes at 400 rpm. Introduced in the same way are 144 g of

TABLE II

| | Inventive Catalyst (A3) 0.3% by weight | Inventive Catalyst (A4) 0.3% by weight | Inventive Catalyst (A2) 0.3% by weight | Comparative DBTDL (0.05%) amino silane 0.52% | Comparative PITA SM 1% by weight | Comparative TBOT 1% by weight |
|---|---|---|---|---|---|---|
| SAH 3 × 2 mm before immersion in oil | 40 | 41 | 45 | 21 | 30 | 28 |
| SAH 3 × 2 mm after immersion in oil | 27 | 30 | 31 | 0 | 8 | 3 |
| Residual SAH (%) | 67 | 73 | 69 | 0 | 27 | 17 |

Residual SAH (%) = 100 × SAH after treatment in oil/initial SAH.

It is clearly apparent that the oil resistance as seen through the residual SAH (%) after prolonged immersion in an engine oil is particularly excellent for the three joints obtained with the compositions according to the invention, comprising the catalysts (A2), (A3) and (AA).

diatomaceous earth, Celite350. The mixture then undergoes a degassing phase of 8 minutes under partial vacuum of 50 mbar and with stirring at 130 rpm, after which 10.8 g of di(cyclohexyl)methylbutylguanidine (A4) are added under nitrogen and dispersed at 400 rpm for 5 minutes. The mixture undergoes a second degassing phase of 3 minutes under 40 mbar and with stirring at 130 rpm. Lastly, the mixture is transferred to closed plastic cartridges.

d) Formulation 4 with Catalyst (A4)—Inventive

A mixer equipped with a butterfly-type stirrer is charged with 768 g of α,ω-dihydroxy polydimethylsiloxane oil with a viscosity of 20 000 mPa·s at 23° C. and 24 g of vinyltrimethoxysilane (VTMO). This mixture is homogenized by rotation of the "butterfly" at 200 rpm for 2 minutes. Next, 4.8 g of a functionalization catalyst based on lithium hydroxide monohydrate in solution in methanol are added over 30 seconds. This is followed by a homogenization phase of 4 minutes at 400 rpm. Then 36 g of D4 treated silica are incorporated at a moderate stirring speed of 160 rpm and are dispersed for a further 4 minutes at 400 rpm. Introduced in the same way are 360 g of Winnofil carbonate from Solvay. The mixture then undergoes a degassing phase of 8 minutes under partial vacuum of 50 mbar and with stirring at 130 rpm, after which 7.2 g of di(cyclohexyl)methylbutylguanidine (A4) are added under nitrogen and dispersed at 400 rpm for 5 minutes. The mixture undergoes a second degassing phase of 3 minutes under 40 mbar and with stirring at 130 rpm. Lastly, the mixture is transferred to closed plastic cartridges.

e) Formulation 4a with Catalyst (A4)—Inventive (Branched Silicone)

A mixer equipped with a butterfly-type stirrer is charged with 696 g of branched polydimethylsiloxane oil, of general formula MxDyQz, containing 0.06% by weight of hydroxyl groups OH, and 36 g of vinyltrimethoxysilane (VTMO). This mixture is homogenized by rotation of the "butterfly" at 200 rpm for 2 minutes. Next, 4.8 g of a functionalization catalyst based on lithium hydroxide monohydrate in solution in methanol are added over 30 seconds. This is followed by a homogenization phase of 4 minutes at 400 rpm. Then 36 g of D4 treated silica are incorporated at a moderate stirring speed of 160 rpm and are dispersed for a further 4 minutes at 400 rpm. Introduced in the same way are 420 g of Winnofil carbonate from Solvay. The mixture then undergoes a degassing phase of 8 minutes under partial vacuum of 50 mbar and with stirring at 130 rpm, after which 7.2 g of di(cyclohexyl)methylbutylguanidine (A4) are added under nitrogen and dispersed at 400 rpm for 5 minutes. The mixture undergoes a second degassing phase of 3 minutes under 40 mbar and with stirring at 130 rpm. Lastly, the mixture is transferred to closed plastic cartridges.

f) Formulation 5 PITA SM Catalyst—Comparative

A mixer equipped with a butterfly-type stirrer is charged with 763 g of α,ω-dihydroxy polydimethylsiloxane oil with a viscosity of 20 000 mPa·s at 23° C., 120 g of α,ω-trimethylsilyl polydimethylsiloxane oil with a viscosity of 100 mPa·s at 23° C., 12 g of a black coloring base containing carbon black, and 24 g of vinyltrimethoxysilane (VIMO). This mixture is homogenized by rotation of the "butterfly" at 200 rpm for 2 minutes. Then 4.8 g of a functionalization catalyst based on lithium hydroxide monohydrate in solution in methanol are added over 30 seconds. This is followed by a homogenization phase of 4 minutes at 400 rpm. Then 108 g of silica surface-treated with tetraoctylcyclosiloxane (D4) are incorporated at a moderate stirring speed of 160 rpm and dispersed for 4 additional minutes at 400 rpm. Introduced in the same way are 144 g of a diatomaceous earth, Celite 350.

The mixture then undergoes a degassing phase of 8 minutes under a partial vacuum of 50 mbar and with stirring at 130 rpm, and then 24 g of PITA SM catalyst (supplied by the company Dupont: mixture of 80% (iPrO)$_2$(EAA)$_2$Ti and 20% of methyltrimethoxysilane, where EAA=ethyl acetoacetate) are subsequently added under nitrogen and dispersed at 400 rpm for 5 minutes.

The mixture undergoes a second degassing phase of 3 minutes under 40 mbar and with stirring at 130 rpm. Lastly, the mixture is transferred to closed plastic cartridges.

g) Formulation 6 PITA SM Catalyst—Comparative

A mixer equipped with a butterfly-type stirrer is charged with 667 g of α,ω-dihydroxy polydimethylsiloxane oil with a viscosity of 20 000 mPa·s at 23° C., 109 g of α,ω-trimethylsilyl polydimethylsiloxane oil with a viscosity of 100 mPa·s at 23° C., 12 g of a black coloring base containing carbon black, and 27 g of vinyltrimethoxysilane (VTMO). This mixture is homogenized by rotation of the "butterfly" at 200 rpm for 2 minutes. Then 4.8 g of a functionalization catalyst based on lithium hydroxide monohydrate in solution in methanol are added over 30 seconds. This is followed by a homogenization phase of 4 minutes at 400 rpm. Then 33 g of D4 treated silica are incorporated at a moderate stirring speed of 160 rpm and dispersed for 4 additional minutes at 400 rpm. Introduced in the same way are 328 g of Winnofil carbonate from Solvay. The mixture then undergoes a degassing phase of 8 minutes under a partial vacuum of 50 mbar and with stirring at 130 rpm, and then 22 g of PITA SM catalyst from Dupont are subsequently added under nitrogen and dispersed at 400 rpm for 5 minutes. The mixture undergoes a second degassing phase of 3 minutes under 40 mbar and with stirring at 130 rpm. Lastly, the mixture is transferred to closed plastic cartridges.

IV-2) Then a joint in the form of a film 2 mm thick, prepared by crosslinking formulations 1 to 6 described above, is applied to an aluminum substrate. After 14 days under controlled conditions (23° C.±2° C. and 50%±5 humidity), the Shore A hardness and the mechanical properties on tension (breaking strength and modulus at 100% elongation) are then measured on specimens with a thickness of 2 mm.

IV-3) The coated supports are subsequently immersed in an engine oil (ELF 5W30 diesel) and heated at 150° C. for 70 hours. After this heating period, they return to ambient temperature, still immersed in the oil, and are then extracted from the oil. The following characteristics are then measured:

Shore A hardness on the oil-swollen film, and
Mechanical properties in tension, on oil-swollen specimens.

IV-4) For formulations 3, 4, and 5, a hot engine oil sealing test is also carried out, by applying a bead from the uncrosslinked test formulation to a contact surface of one of the two elements to be assembled (elements=aluminum substrate). The elements are assembled by applying them against one another via their contact zone before the composition crosslinks to elastomer, after which the composition is left to crosslink to a silicone elastomer in the presence of moisture provided by the ambient air, so as to form a silicone gasket. The assembly is then immersed in a reference engine oil. The temperature of the oil is maintained at 150° C. for 3 days. After cooling, a measurement is made of the force (adhesive bond breaking force, unit N) that must be applied in order to disbond the two elements. The results are set out in Table II below Shore A hardness (SAH) measured in accordance with standard DIN 53505;

Breaking strength (B/S) in MPa, measured in accordance with standard AFNOR NFT 46002; and Elastic modulus at 100%, in MPa, measured according to the aforementioned standard.

TABLE III

Results of the two oil resistance tests

| | | Inventive Examples | | | | | Comparative Examples | |
|---|---|---|---|---|---|---|---|---|
| Formulations | | 1 | 2 | 3 | 4 | 4a | 5 | 6 |
| Catalysts | | (A3) | (A4) | (A4) | (A4) | (A4) | titanate | titanate |
| Before immersion in the Elf "Evolution" 5w30 oil | Shore A hardness (14 days) | 34 | 32 | 42 | 30 | 35 | 36 | 32 |
| | Breaking strength (MPa) | 1.7 | 1.9 | 3.4 | 2.4 | 3.9 | 3 | 2.8 |
| | Modulus at 100% (MPa) | 0.7 | 0.7 | 1.2 | 0.5 | 0.66 | 1.0 | 0.7 |
| After immersion in the Elf "Evolution" 5w30 oil | Shore A hardness | 21 | 19 | 27 | 19 | 26 | 4 | 1 |
| | Breaking strength (MPa) | 1.6 | 1.6 | 1.5 | 1.8 | Not measured | 0.9 | 1.3 |
| | Modulus at 100% | 0.6 | 0.5 | 0.8 | 0.5 | Not measured | 0.2 | 0.15 |
| | Sealing test - Adhesive bond breaking force (N) | Not measured | Not measured | 110 | >150 | Not measured | 30 | Not measured |

It is found that the silicone elastomers providing the seal that are obtained with the catalysts according to the invention exhibit mechanical properties (Shore A hardness, breaking strength, modulus at 100%) that are superior to those of the comparatives after immersion for 70 hours in an engine oil at 150° C., hence simulating extreme conditions which may be encountered by elements in contact with a fluid used in a drive train.

For the hot engine oil sealing test, it is found that formulations 3 and 4 according to the invention exhibit properties four to five times superior to those of the comparative (formulation 5).

V) Qualitative Adhesion Tests (Acetoxy RTV-1-Acetoxy-Type Silane Crosslinker)

a) Formulation tested (% by weight):
The following paste is prepared:
70.8% of α,ω-dihydroxy polydimethylsiloxane oil with viscosity of 50 000 mPa·s
6.4% of α,ω-dihydroxy polydimethylsiloxane oil with viscosity of 14 000 mPa·s α,ω-dihydroxy
9.6% of polydimethylsiloxane oil with viscosity of 500 mPa·s
10.4 of dimethylsilazane-treated silica
This paste is then admixed with x % of the catalyst under test and 3.8% of a mixture of ethyltriacetoxysilane and methyltriacetoxysilane.
b) Amount of catalyst added (% by weight)//number of equivalents (eq)/number of moles of tin
DBTDL 0.06%//1 eq
Catalyst (A3)=0.14%//5 eq Catalyst (A4)=0.10%//5 eq
c) To carry out qualitative adhesion tests, a bead of product prepared from the formulation under test is applied to an aluminium substrate, cleaned beforehand. After a crosslinking time of 7 days (at 23° C. and 50% RH=residual humidity), a manual peel is performed, after initiation of delamination at the substrate/seal interface. The results are expressed as a function of the fracture mode of the bead of product:

"AF": adhesive fracture (the bead undergoes delamination from the substrate),
"AF+": fracture with adhesive tendency, but requiring application of force to delaminate the bead,
"AF++": fracture with adhesive tendency, but requiring application of substantial force to delaminate the bead, and
"CF": cohesive fracture (the bead breaks under the application of a very high force, without being delaminated from the substrate, even partly); in this case, adhesion to the substrate is optimum.

TABLE IV

| | Adhesion to substrate | | | | |
|---|---|---|---|---|---|
| | PMMA | Anodized aluminum | Thermocoated aluminum | Glass | PVC |
| Catalyst DBTDL Comparative | AF | AF+ | AF | CF | AF |
| Catalyst (A3) Inventive | AF | AF++ | AF | CF | CF |
| Catalyst (A4) Inventive | AF | AF+ | AF | CF | AF+ |

PMMA substrate = polymethyl methacrylate substrate
PVC substrate = polyvinyl chloride substrate.

It is noted that the elastomers prepared using catalysts according to the invention exhibit adhesion which is as good as those prepared using tin catalysts.

The invention claimed is:
1. A method for sealing and assembling at least one component of a drive train, the method comprising the following steps a) to d):
   a) preparing a polyorganosiloxane composition X which is crosslinkable to elastomer by polycondensation reactions, which contains no metal catalyst, and which comprises:

a silicone base B comprising at least one polyorganosiloxane oil which is crosslinkable by polycondensation reaction so as to form a silicone elastomer, and a catalytically effective amount of at least one polycondensation catalyst A which is a nonsilylated organic compound conforming to the general formula (I):

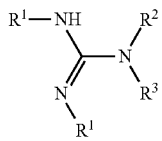  (I)

in which
the identical or different radicals $R^1$ represent independently of one another a linear or branched monovalent alkyl group, a cycloalkyl group, a (cycloalkyl)alkyl group, the cyclic moiety being substituted or unsubstituted and optionally comprising at least one heteroatom or a fluoroalkyl group, the radical $R^2$ represents a hydrogen atom, a linear or branched monovalent alkyl group, a cycloalkyl group, an alkyl group substituted by a cyclic moiety which is substituted or unsubstituted and optionally comprises at least one heteroatom, an aromatic group, an arylalkyl group, a fluoroalkyl group or an alkylamine or alkylguanidine group, and the radical $R^3$ represents a linear or branched monovalent alkyl group, a cycloalkyl group, an alkyl group which is substituted by a cyclic moiety which is substituted or unsubstituted and optionally comprises at least one heteroatom, or an arylalkyl, fluoroalkyl, alkylamine or alkylguanidine group, when the radical $R^2$ is not a hydrogen atom, the radicals $R^2$ and $R^3$ can be joined to form a 3-, 4-, 5-, 6- or 7-membered aliphatic cyclic moiety optionally substituted by one or more substituents, and with the further condition that the radicals $R^1$, $R^2$, and $R^3$ contain no silicon atom;

b) applying said polyorganosiloxane composition X to at least one contact zone of said component, continuously or discontinuously, optionally in the form of a bead;

c) causing said polyorganosiloxane composition X to crosslink to silicone elastomer in the presence of moisture provided by ambient air or by prior addition of water, so as to form a profiled gasket; and d) assembling said component to another component of the drive train, in such a way that the joint formed provides for assembly and sealing between the two components of the drive train.

2. The method as claimed in claim 1, wherein steps c) and d) are replaced respectively by the following steps c1) and d1):

c1) contacting the zone or zones comprising said noncrosslinked polyorganosiloxane composition X with a contact surface of the other component of the drive train, and assembling the two components of the drive train, and d1) causing said polyorganosiloxane composition X to crosslink to silicone elastomer in the presence of moisture provided by the ambient air or by prior addition of water, so as to form a yielded gasket providing assembly and sealing between the two components of the drive train.

3. The method as claimed in claim 1, wherein the component of the drive train is selected from the group consisting of a cylinder head, an oil sump, a cylinder head cover, a timing case, a bearing bar, an engine cylinder block, a transmission, a water pump, a positive crankcase ventilation box, a water filter, an oil filter, an oil pump, a box comprising electronic components of a drive train, and a clutch housing.

4. The method as claimed in claim 1, wherein the polycondensation catalyst A is a nonsilylated organic compound selected from the group consisting of the following compounds (A1) to (A6):

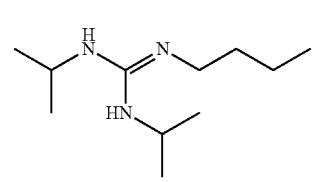 (A1)

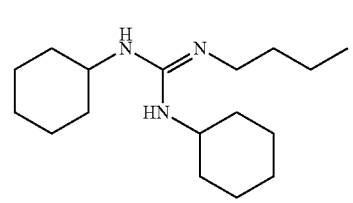 [SMILES: CCCCN=C(NC1CCCCC1)NC1CCCCC1] (A2)

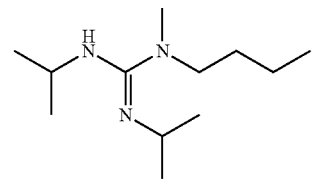 (A3)

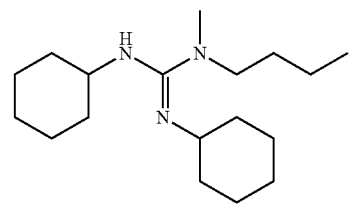 [SMILES: CCCCN(C)/C(=N\C1CCCCC1)NC1CCCCC1] (A4)

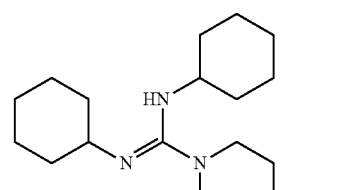 (A5)

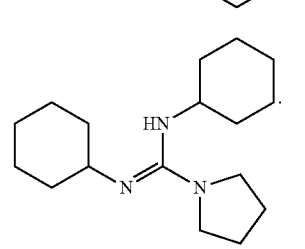 (A6)

5. The method as claimed in claim 1, wherein the polyorganosiloxane composition X which is crosslinkable to elastomer by polycondensation reactions comprises a catalytically effective amount of at least one polycondensation catalyst A as defined in claim 1 and a silicone base B comprising:
   at least one polyorganosiloxane oil C which is crosslinkable by polycondensation to give an elastomer;
   optionally at least one crosslinking agent D;
   optionally at least one adhesion promoter E; and
   optionally at least one nonsiliceous, organic and/or siliceous inorganic filler F.

6. The method as claimed in claim 1, wherein the polyorganosiloxane composition X which is crosslinkable to elastomer by polycondensation reactions comprises:
   per 100 parts by weight of at least one polyorganosiloxane oil C capable of crosslinking by polycondensation, which is a reactive α,ω-dihydroxydiorganopolysiloxane polymer in which the organic radicals are hydrocarbon radicals;
   from 0.1 to 60 parts by weight of at least one crosslinking agent D selected from the group consisting of polyalkoxysilanes, the products originating from partial hydrolysis of a polyalkoxysilane, and polyalkoxysiloxanes;
   from 0 to 60 parts by weight of an adhesion promoter E as described above;
   from 0 to 250 parts by weight, of at least one nonsiliceous, organic and/or siliceous inorganic filler F;
   from 0 to 10 parts by weight of water,
   from 0 to 100 parts by weight of at least one nonreactive linear polyorganosiloxane polymer G comprised of a linear homopolymer or copolymer in which, per molecule, mutually identical or different monovalent organic substituents bonded to the silicon atoms are selected from the group consisting of alkyl, cycloalkyl, alkenyl, aryl, alkylarylene, and arylalkylene radicals,
   from 0 to 20 parts by weight of a coloring base or of a colorant H,
   from 0 to 70 parts by weight of polyorganosiloxane resins I, and
   from 0 to 20 parts of auxiliary additive J selected from the group consisting of plasticizers, organic diluents, crosslinking retarders, mineral oils, antimicrobial agents, and heat stabilizer additives, and
   from 0.1 to 50 parts by weight of at least one polycondensation catalyst A as defined according to claim 1.

7. The method as claimed in claim 6, wherein the hydrocarbon radicals are selected from the group consisting of alkyls having from 1 to 20 carbon atoms; cycloalkyls having from 3 to 8 carbon atoms; alkenyls having from 2 to 8 carbon atoms; and cycloalkenyls having from 5 to 8 carbon atoms.

8. The method as claimed in claim 6, wherein the at least one siliceous, organic and/or siliceous inorganic filler F is present in an amount from 5 to 200 parts by weight.

9. The method as claimed in claim 6, wherein the auxiliary additive J is a titanium dioxide, an iron oxide or a cerium oxide.

10. The method as claimed in claim 1, wherein the polyorganosiloxane composition X crosslinkable to elastomer by polycondensation reactions is prepared from a two-component system which takes the form of two separate parts P1 and P2, which are intended to be mixed to form said polyorganosiloxane composition X, with one of these parts comprising the polycondensation catalyst A as defined in claim 1 and the crosslinking agent D, while the other part is free of the aforementioned species, and comprises:
   per 100 parts by weight of the polyorganosiloxane oil or oils C that crosslink by polycondensation to an elastomer, and
   from 0.001 to 10 part(s) by weight of water.

11. The method as claimed in claim 1, wherein the polyorganosiloxane composition X crosslinkable to elastomer by polycondensation reactions is prepared from a one-component system which is stable on storage in the absence of moisture and which crosslinks to elastomer in the presence of water, comprising:
   at least one crosslinkable linear polyorganosiloxane oil C which has functionalized alkoxy, oxime, acyl and/or enoxy end groups,
   at least one crosslinking agent D,
   at least one filler F, and
   at least one catalyst of the polycondensation reaction, which is the polycondensation catalyst A as defined in claim 1.

12. The method as claimed in claim 11, wherein the polyorganosiloxane oil C has functionalized end groups of alkoxy type and is prepared in situ by reacting, in the presence of a catalytically effective amount of lithium hydroxide, a branched polydimethylsiloxane having hydroxyl groups bonded to a silicon atom, and of general formula $M_xD_yQ_z$ (where x, y, and z are integers), or a linear diorganopolysiloxane, comprising a hydroxyl group bonded to a silicon atom at each chain end, with at least one polyalkoxysilane of formula (II) below:

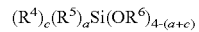  (II)

in which:
   a is 0, 1 or 2,
   c is 0, 1 or 2,
   the sum a+c is equal to 0, 1 or 2,
   $R^4$ represents an aliphatic, cyclanic or aromatic, substituted or unsubstituted, and saturated or unsaturated monovalent $C_1$ to $C_{13}$ hydrocarbon radical, wherein $R^4$ can be identical to $R^5$,
   $R^5$ represents an aliphatic, cyclanic or aromatic, substituted or unsubstituted, and saturated or unsaturated $C_1$ to $C_{13}$ monovalent hydrocarbon radical, which can comprise an epoxy, primary, secondary or tertiary amine, or mercapto function, and
   $R^6$ represents an aliphatic organic radical having from 1 to 8 carbon atoms selected from the group consisting of alkyl radicals, alkyl ether radicals, alkyl ester radicals, alkyl ketone radicals, alkylcyano radicals, and aralkyl radicals having from 7 to 13 carbon atoms, wherein the alkoxy groups of the silane of formula (II) can each have a different meaning for $R^6$, or the same meaning.

13. The method as claimed in claim 11, wherein the end group on the at least one crosslinkable linear polyorganosiloxane oil C is an alkoxy group.

14. A method of preparing a silicone gasket, the method comprising preparing the silicone gasket with the polyorganosiloxane composition X crosslinkable to elastomer by polycondensation reactions, as defined in claim 1, wherein the resulting silicone gasket exhibits high aging resistance in fluids used in a drive train.

* * * * *